(12) United States Patent
Spittler et al.

(10) Patent No.: US 11,976,746 B2
(45) Date of Patent: May 7, 2024

(54) FAIL-SAFE ACTUATOR AND ASSEMBLY UNIT

(71) Applicant: Schischek GmbH, Langenzenn (DE)

(72) Inventors: Harald Spittler, Langenzenn (DE); Jan Welzien, Langenzenn (DE); Christoph Beyer, Langenzenn (DE)

(73) Assignee: SCHISCHEK GMBH, Langenzenn (DE)

( * ) Notice: Subject to any disclaimer, the term of this patent is extended or adjusted under 35 U.S.C. 154(b) by 222 days.

(21) Appl. No.: 17/626,260

(22) PCT Filed: Jun. 22, 2020

(86) PCT No.: PCT/EP2020/067311
§ 371 (c)(1),
(2) Date: Jan. 11, 2022

(87) PCT Pub. No.: WO2021/004769
PCT Pub. Date: Jan. 14, 2021

(65) Prior Publication Data
US 2022/0373099 A1    Nov. 24, 2022

(30) Foreign Application Priority Data
Jul. 11, 2019   (DE) .................... 10 2019 118 833.4

(51) Int. Cl.
*F16K 31/53*    (2006.01)
*F16H 33/02*    (2006.01)
(Continued)

(52) U.S. Cl.
CPC ............. *F16K 31/53* (2013.01); *F16H 33/02* (2013.01); *F16K 31/043* (2013.01);
(Continued)

(58) Field of Classification Search
CPC ...... F16K 31/53; F16K 31/043; F16K 31/047; F16K 31/535; F16K 31/54; F16K 31/563; F16H 33/02
(Continued)

(56) References Cited

U.S. PATENT DOCUMENTS 3,808,895 A * 5/1974 Fitzwater .............. F16K 31/563
251/71
4,741,508 A * 5/1988 Fukamachi ............. F16K 31/53
251/71
(Continued)

FOREIGN PATENT DOCUMENTS

CN    101549491 A    10/2009
CN    102713346 A    10/2012
(Continued)

*Primary Examiner* — John Bastianelli
(74) *Attorney, Agent, or Firm* — Dickinson Wright PLLC; Andrew D. Dorisio (57) ABSTRACT

A fail-safe actuator for moving a part has in each case a drive (18, 118) by means of which a first or a second drive train (24, 26) can be moved. The drive trains (24, 26) in each case have their own output shaft (34, 38) and can be actuated independently of one another. An energy storage device is coupled with the second output shaft (38), wherein a holding device selectively holds the energy or releases it from the energy storage device, so that the second output shaft (38) can be moved. A rotary entrainment of the first output shaft (34) ensures that in the event of a failure of the drive (18) this is moved into a specified end position. The two output shafts (34, 38) are set in motion via gear wheels (32, 36) if the drive trains are actuated. An assembly unit consisting of actuator and moved part is also described.

19 Claims, 7 Drawing Sheets

(51) Int. Cl.
*F16K 31/04* (2006.01)
*F16K 31/54* (2006.01)
*F16K 31/56* (2006.01)

(52) U.S. Cl.
CPC .......... *F16K 31/047* (2013.01); *F16K 31/535* (2013.01); *F16K 31/54* (2013.01); *F16K 31/563* (2013.01)

(58) Field of Classification Search
USPC ................... 251/129.03, 71; 185/40 R; 74/2
See application file for complete search history.

(56) References Cited

U.S. PATENT DOCUMENTS

| | | | |
|---|---|---|---|
| 5,182,498 A | 1/1993 | Stuhr | |
| 5,195,721 A * | 3/1993 | Akkerman | F16D 43/2024 192/81 C |
| 5,832,779 A * | 11/1998 | Madrid | F16H 25/20 137/72 |
| 6,254,058 B1 | 7/2001 | Keller | |
| 7,752,933 B2 * | 7/2010 | Parsons | F16K 31/048 74/322 |
| 10,197,141 B2 * | 2/2019 | Armstrong | F16H 33/02 |
| 2009/0127485 A1 | 5/2009 | Wessel et al. | |

FOREIGN PATENT DOCUMENTS

| | | |
|---|---|---|
| CN | 107676525 A | 2/2018 |
| GB | 2572735 A | 10/2019 |
| JP | H08189554 A | 7/1996 |
| JP | 2017150619 A | 8/2017 |
| RU | 2196928 C1 | 1/2003 |
| RU | 2617520 C1 | 4/2017 |
| SU | 504514 A3 | 2/1976 |

* cited by examiner

FAIL-SAFE ACTUATOR AND ASSEMBLY UNIT

TECHNICAL FIELD

The invention relates to a fail-safe actuator for moving a part between two end positions, and an assembly unit with such an actuator and a part moved by the actuator.

BACKGROUND

In particular, the invention relates to an actuator which actuates valves or ventilation flaps. The actuator according to the invention can be used to control fluid flows. Such industrially used actuators are used in a wide variety of branches of industry, for example in the oil and gas industry, in drinking water and waste water companies, energy plants, ships, mines, food-processing plants as well as in pharmaceutical and chemical companies. Such fail-safe actuators are also used in buildings, tunnels and the like. The object is to ensure a specified position of the driven part in the event of a failure of the drive in order to be able to verify an unequivocal position of the part moved by the actuator in case of emergency. In most cases this unequivocal position is that in which the overall system in which the moved part is embedded (in the example, a ventilation system or a process plant) is in a safe state.

Fail-safe actuators are for example used in HVAC applications, that is heating, ventilation and air conditioning applications, in order to actuate valve flaps or ventilation flaps and control the temperature or airflow in particular locations, for example in tunnels. In tunnels for example, in the event of a fire the corresponding ventilation flap system must be moved into a predetermined position, irrespective of whether this involves a road tunnel, a train tunnel or a tunnel in a mine.

SUMMARY

The object of the invention is to create a fail-safe actuator for moving a part between two end positions which is compact in structure and flexible in use.

According to a first aspect of the invention there is provided a fail-safe actuator for moving a part between two end positions, comprising:
  a first drive,
  a first drive train which can be set in motion by the first drive which has a first output shaft which transmits the movement of the actuator outwards in the direction of the part,
  a second drive,
  a second drive train which can be set in motion by the second drive which has a second output shaft which runs coaxially with the first output shaft,
  wherein the first and/or the second drive can be activated, selectively, in order to set the first and/or second output shaft in motion,
  an energy storage device which is coupled with the second drive train,
  at least one externally actuatable holding device which ensures, selectively, that the energy stored in the energy storage device remains in the energy storage device or is released to the second drive train,
  a mechanical rotary entrainment device between the second output shaft and the first output shaft which is configured such that it
    permits a rotation of the first output shaft relative to the second output shaft by at least one angle of rotation which is associated with the distance between the end positions if the energy storage device is not released and if the drive moves the first output shaft between the end positions, and
    provides a rotary entrainment of the first output shaft by the second output shaft with the energy storage device released and the failed drive in a first of the two end positions.

The actuator according to the invention can be configured such that different states are achieved by means of the two separate drives. The first drive train can be moved directly by the assigned first drive. Alternatively, the second drive train can be moved with its assigned second drive, as a result of which the energy storage device can absorb energy. Alternatively, both drive trains can be moved by their respective drives, so that the part which is to be moved, for example the valve flap or a ventilator flap, can be moved by means of the first drive train and the energy storage device can also be loaded at the same time. This can make it possible for the actuator to be used very flexibly.

The coaxial arrangement of the first output shaft and the second output shaft can allow a compact design which can also be of simple construction. The mechanical rotary entrainment device between the two output shafts is thereby important. On the one hand, this rotary entrainment device can permit the movement of the part solely by means of the first drive train and on the other hand can permit a rotary entrainment in the event of a safety-critical incident, if the drive fails and the part which is to be moved has to be moved into a specified end position through the release of the energy from the energy storage device. Switchable couplings can thus be dispensed with.

The teeth on each of the gear wheels, via which energy is introduced in the direction of output shafts, can be provided over a relatively large section of the circumference. While flaps only need to be moved by 90° in order to change from the closed state into the completely opened state, a reconfiguration of the actuator makes it possible to reverse the direction of movement of the second drive train. This means that the released energy storage device can ensure that the first output shaft is moved in the contrary direction by being driven by the second output shaft. This can be made possible through simple reconfiguration measures, for example the installation of a reverse-acting energy storage device or of a reversible energy storage device, as will be described in detail in the following.

The two drives can be electric motors.

The two drives, the rotary entrainment device and the holding device are optionally configured and controllable in a coordinated manner such that,
  in a first state, the second drive can move the second output shaft in the direction of the second of the two end positions and energy can thereby be introduced into the energy storage device, in particular wherein the first output shaft is not thereby moved,
  in a subsequent second state, the at least one holding device can hold the energy in the energy storage device and the first drive can then move the part between its end positions,
  in a subsequent third state, in which both drives fail, the holding device can release the energy in the energy storage device and as a result the second output shaft can be moved in the direction of the first end position and a rotary entrainment of the first drive train in the direction of the first end position is made possible.

In this embodiment of the invention, the energy in the energy storage device can be exclusively introduced through movement of the second drive train, the first drive train remains passive.

Alternatively, in the first state both drives can be driven, i.e. activated, and move, so that both output shafts are moved in the direction of the second of the two end positions, as a result of which energy can be introduced into the energy storage device. An advantage of this embodiment can be that the process of introducing energy takes place very quickly because no return stroke for the second drive train alone is necessary. With the input of energy, the part can at the same time be moved into its open or closed position, depending on whether the second end position is an open or closed position.

In yet another embodiment, in the first state, on driving the first output shaft in the direction of the second of the two end positions, with discharged energy storage device and enabled holding device, the first output shaft can carry the second output shaft with it, so that the output shafts are coupled with one another. In this way, energy can be introduced from the first output shaft into the second output shaft and transferred into the energy storage device.

Moreover, according to an embodiment of the invention the holding device can hold the second output shaft in the second state and thus secure the energy storage device in the state in which the energy remains in the energy storage device. If for example the energy storage device comprises a spring, the spring can be tensioned in the second state, and the holding device can then hold the second output shaft in position, so that the spring cannot relax. Thus, the energy storage device and the second output shaft can be in a specified, unequivocal state at the same time.

If each drive train is assigned its own holding device, these drive trains can be enabled independently of one another. For example the holding device of the first drive train can ensure that the moved part is also held in a specified position against external influences, so that a securing of the position is achieved. However, in order to prevent one drive from working against a holding device of the other drive, if one drive would operate unintentionally through the holding device of the other, both holding devices must be open.

In order to keep the dimension of the holding devices as small as possible, according to an embodiment of the invention the holding device can act directly on a drive shaft of the drive, or on a shaft connected directly with the drive shaft, or a shaft in close proximity thereto and rests on it.

According to an embodiment of the invention, the holding device or holding devices can be an electromagnetic brake.

The energy storage device can be coupled directly or indirectly with the second output shaft in a non-destructively detachable manner in order to allow it to be replaced or reversed. Depending on the design of the actuator and its intended use, different energy storage devices with more or less energy absorption capacity can thus be used, or the direction of rotation in which the energy storage device acts can be changed.

In this connection it is optimal if, with the same rotary entrainment device, the second output shaft can entrain the first output shaft in opposite directions of rotation, wherein the direction of rotation is dependent on the direction of rotary effect of the energy storage device. Consequently, the rotary entrainment device can be used irrespective of whether or not the direction of rotary effect is reversed. This can allow a high flexibility in the use of the actuator according to the invention.

According to an embodiment of the invention, the energy storage device can be coupled to the second output shaft in two different positions, and in a first position can ensure that the first output shaft can be pressed into one end position and in a second position can be pressed into the opposite end position. Consequently, the user of the actuator does not need different energy storage devices in order to change the direction of rotary effect of the energy storage device, but can use the same energy storage device, which they remove from the actuator and couple into a different position. The actuator according to the invention can thus be very versatile in use.

According to one embodiment of the invention, the first position of the energy storage device differs from the second position in that the energy storage device can be inverted by 180° and thus no longer is coupled to the second output shaft on the front side but on the rear side. This can ensure a simple attachment of the energy storage device, which for example has a shaft socket on its opposite sides with which it is for example fitted directly onto the second output shaft.

The first and the second output shaft can be coupleable in the direction of rotation by means of stop surfaces which come into contact with one another. This can be a very simple possibility for achieving the rotary entrainment.

The stop surfaces can thereby be provided on opposite end faces of the gear wheels or the first and the second output shafts. This transmission of torque via the end faces can lead to a small radial space requirement.

A particularly economical embodiment for the configuration of the rotary entrainment device can involve providing the stop surfaces in the form of projections or pins on the gear wheels or the output shafts. In particular, the embodiment involving coupling pins on the end faces of the gear wheels can be advantageous in term of cost because it is only necessary to create corresponding bores in the gear wheels, which leads to a high flexibility in terms of the position of the pins. For other actuators which are intended to cover other angular ranges, the pins can be used on the same gear wheels, only with differently-positioned bores.

If stop surfaces of the first and of the second drive train come into contact with one another, i.e. if an end position has been reached, the stop surfaces which are not in contact with one another should be distant from one another by at least 180° to ensure the aforementioned flexibility in the use of the actuator according to the invention. The at least 180° makes it possible to divide the theoretical total movement range into two sections of at least 90°, which for example allows flaps to be moved between 0° and 90° and variably moved in either one or the other direction by the energy storage device.

As already briefly mentioned, the energy storage device can comprise at least one elastic spring element; alternatively, several spring elements, in particular compression springs, arranged symmetrically around the second output shaft can be provided. The second output shaft can also be symmetrically loaded through a symmetrical arrangement, which in addition can increase the service life of the actuator according to the invention.

The compression springs can also be coupled to the second output shaft in pairs by means of a common member, so that several compression springs can act at the same time.

If the member is a gear rack and has gear teeth, it can be axially adjusted in that the second output shaft can be connected with the energy storage device via a gear wheel which meshes with the gear rack.

The variability and compactness of the actuator according to the invention can be increased in that the energy storage device can be designed as a separate, externally closed assembly unit. Several spring elements can be housed in this assembly unit. The coupling point by means of which the energy storage device is coupled detachably to the second output shaft can be accessible from opposite sides, that is from the front and rear side. One example of this is a hub provided in the energy storage device which can be accessible from both sides and via which the torque can then be introduced into the energy storage device, irrespective of whether the energy storage device is coupled to the second output shaft on the front side or on the rear side.

The output shafts with their gear wheels can be designed integrally or as separate parts, and it is possible for only sections of the output shaft to be in each case formed on the gear wheels, to which other sections of the output shaft can in turn be attached in order to define together the entire output shaft. The term "output shaft" thus does not require that this is an integral part which is designed separately from the respective gear wheel.

In order to achieve a desired return time when returning the part into its desired first end position and so that all parts are not unnecessarily stressed due to the abrupt release of energy on striking an end stop, one or both of the drives, which can be electric drives, can be used as generators in that they are reversed. As a result, the generators can be used as flexible, variably adjustable brakes or dampers via which the speed of the movements and the total return time on release of the energy storage device can be adjusted.

The electrical energy generated in the generator can be used to supply the control electronics. This means that in the first moment following the power failure the control is "dead", as a result of which the holding device can open. The energy storage device can then drive the output shaft back and thus also drives the generator. The electrical power generated by the generator can "awaken" the control, which can then detect the return of the spring and "regulate" the return speed.

However, the power output by the energy storage device can be significantly higher than required by the electronics and can lead to voltage surges which can then damage the control electronics.

A part of the surplus energy can be automatically converted into heat in the windings of the motor. The greater part of the surplus electrical energy can be converted into heat in a braking resistance.

According to a second aspect of the invention there is provided an assembly unit with an actuator according to the first aspect of the invention and a part moved by this, which is for example a valve flap or ventilation flap.

BRIEF DESCRIPTION OF THE DRAWINGS

Further features and advantages of the invention are explained in the following description and in the following drawings, to which reference is made. In the drawings.

DETAILED DESCRIPTION

Figure 1:
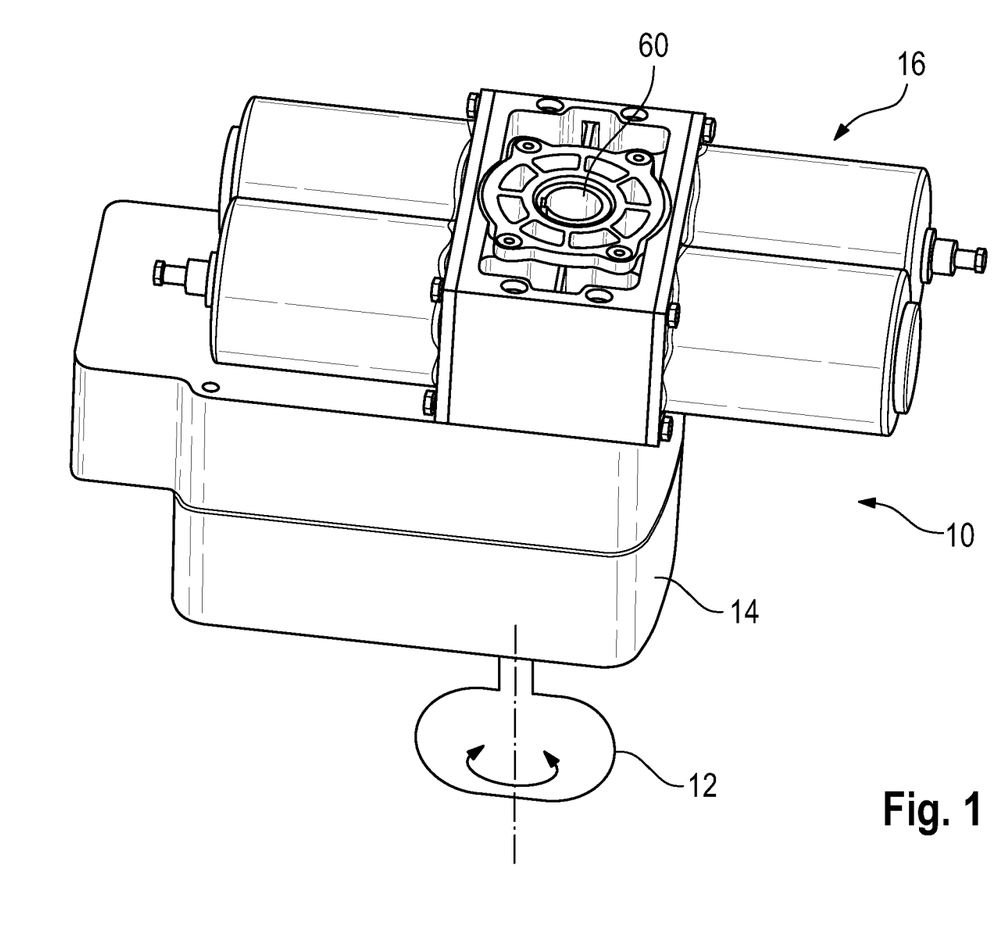
FIG. 1 shows a perspective view of an embodiment of the actuator according to the invention and the assembly according to the invention.

FIG. 1 shows an assembly with a fail-safe actuator 10 which can move a part 12, for example a valve or a ventilation flap, between two end positions.

The actuator has a multiple-part outer housing 14 and an energy storage device 16 flanged or, more generally, fastened to the outer housing 14 which is designed as a separate, externally closed assembly unit.

Figure 2:
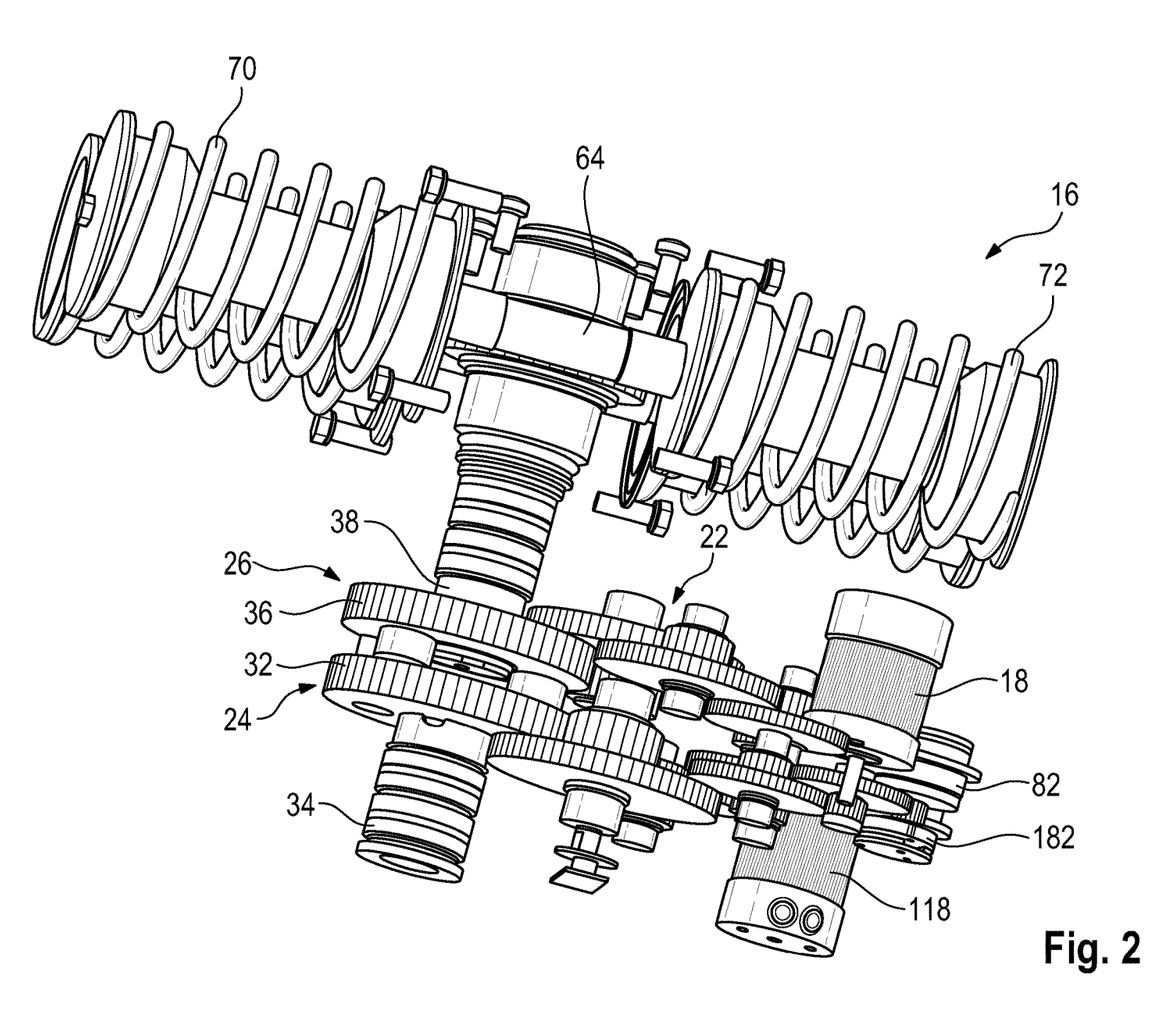
FIG. 2 shows a schematic view of a part of the actuator together with an energy storage device, with the outer housing omitted.

A first and a second electrical drive 18, 118, which can be seen in FIG. 2, are housed in the outer housing 14.

A transmission 22 comprising a first drive train 24 and a second drive train 26 is driven via the drives 18, 118, wherein the first drive train 24 is assigned to the drive 18 and the second drive train 26 is assigned to the drive 118.

The drive trains 24, 26 comprise gear wheels which convert the torque generated by the drive 18, 118 and pass it on into their drive train.

Each drive train 24, 26 can be fixed by a separate holding device assigned thereto. The drive train 24 has a holding device 82 which is designed in the form of an electromagnetic brake and acts on a gear wheel which is driven directly by the pinion of the drive 18. This means that the holding device 82 only needs to hold a very low torque and requires a small power input, so that it can be of compact construction and only exhibits low intrinsic heating. The same also applies to a holding device 182 which is provided for the second drive train 26 and likewise acts directly on a gear wheel which is also driven directly by the pinion of the drive 118.

The first drive train 24 has a first gear wheel 32 which is coupled with a first output shaft 34 or rests thereon. The second gear wheel 36, arranged parallel to the first gear wheel 32, is assigned to the second drive train 26 and is also coupled with a second output shaft 38 or forms part of same.

The output shafts 34, 38 are arranged coaxially with one another and terminate in the gear wheels 32, 36.

The first output shaft 34 leads, directly or with the interposition of other mechanical torque-transmitting parts, to the driven part 12.

Figure 4:
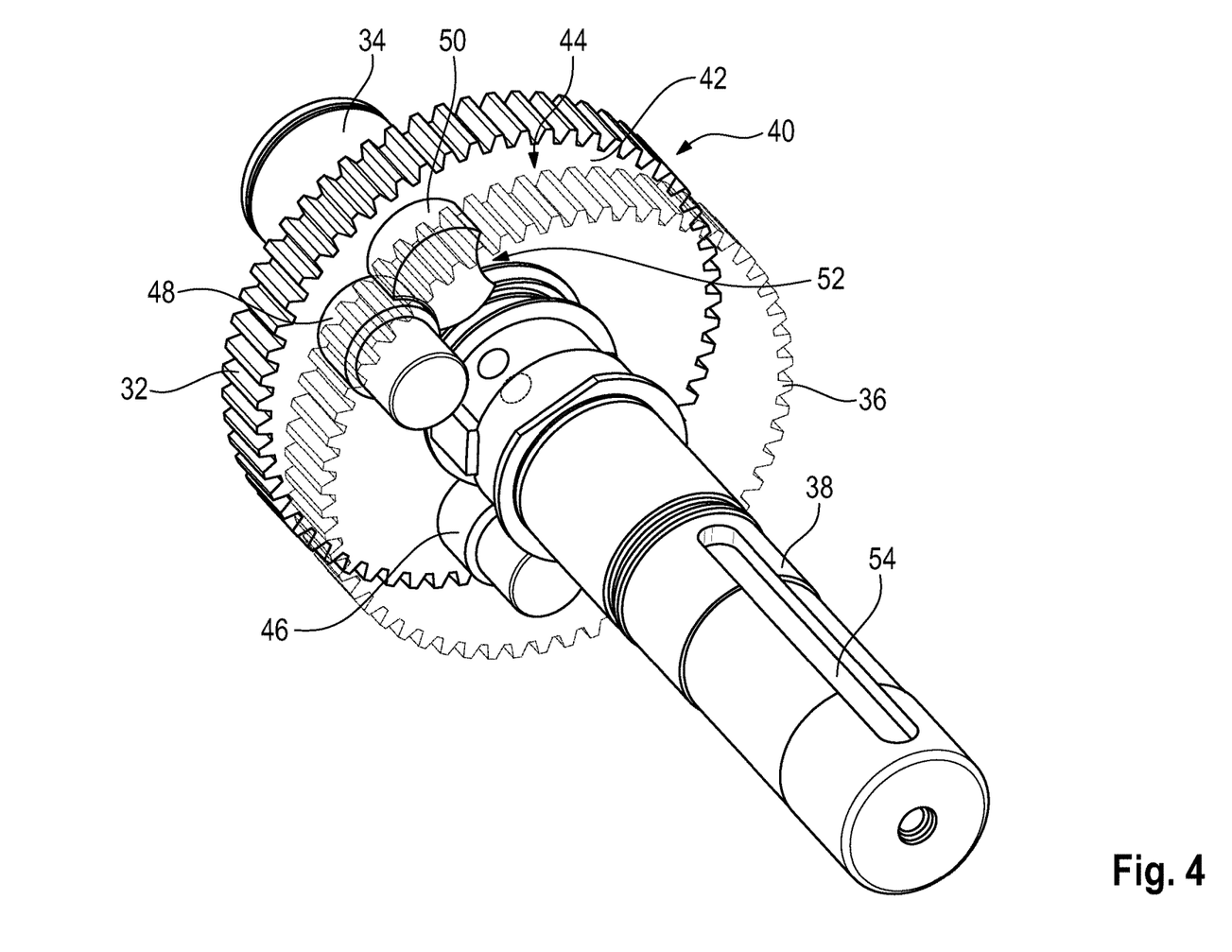
FIG. 4 shows a schematic perspective view, partially transparent, with the rotary entrainment device used with the actuator according to the invention.

Illustrated in FIG. 4 is a mechanical rotary entrainment device 40 between the first output shaft 34 and the second output shaft 38. The rotary entrainment device 40 is realised by means of opposing end faces 42, 44 of the gear wheels 32, 36, wherein stop surfaces are provided here via which the output shafts 34, 38 can be coupled in the direction of rotation.

In the illustrated example, the stop surfaces are formed by projections, more precisely pins, which are fastened to the gear wheels 32, 36 and project axially in relation to these.

Specifically, on the gear wheel 36, a pin 46 and a pin 48 are introduced into corresponding axial openings.

These pins 46, 48 are arranged on the same circular diameter around the imaginary central axis of the output shafts 34, 38. A pin 50 is fastened to the gear wheel 32, likewise in that it is introduced, preferably pressed, into a corresponding axial opening. It too is arranged on the same circular diameter as the pins 46, 48.

Optionally, the pin 50 has on opposite sides in a circumferential direction in each case an indentation 52 which is complementary to the outer diameter or the outer geometry of the pins 46, 48, so that when the pin 50 comes into contact with the pin 46 and the pin 48, not only a linear contact but a planar contact takes place in each case.

It can also be seen in FIG. 4 that the second output shaft 38 is relatively long and has a fitting spring groove 54 via which it is coupled with the energy storage device 16.

Figure 3:
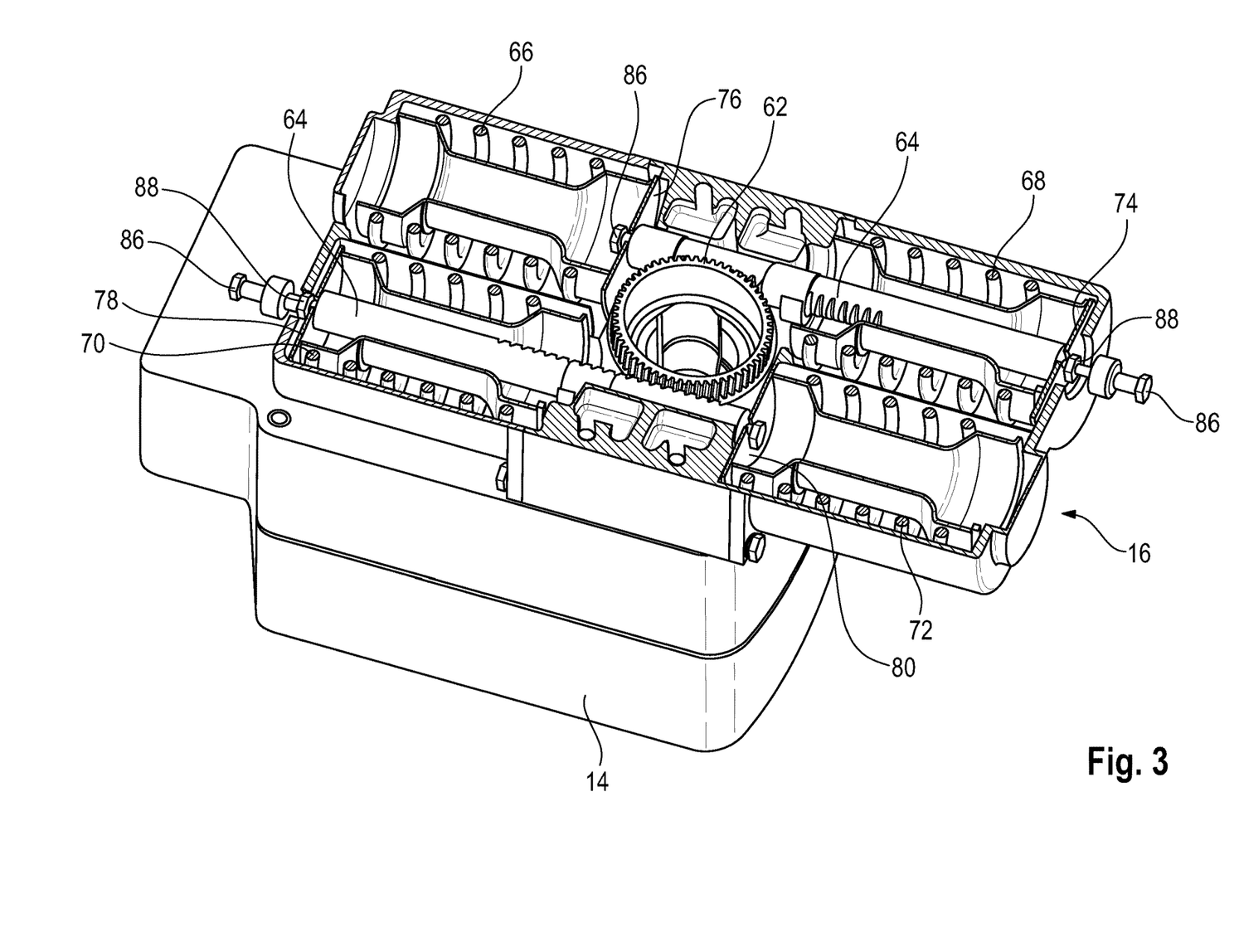
FIG. 3 shows a perspective view of the actuator according to the invention with a cut-away view of the energy storage device.

This energy storage device 16 is shown in a cut-away state in FIG. 3.

The energy storage device 16 has a so-called coupling point 60, which is also shown in FIG. 1, which is designed in the form of a hub. The second output shaft 38 can be introduced into this hub.

The hub is torque-coupled with a gear wheel 62 which is illustrated in FIG. 3.

This gear wheel meshes with two diametrically opposing gear racks 64. Each gear rack 64 has a pair of compression springs 66, 68 or 70, 72 assigned thereto, by means of which return energy can be stored which, in the event of a failure of the drive 18, ensures that the part 12 is moved into a specified end position, even if the part 12 is positioned at a distance therefrom.

The upper gear rack 64 shown in FIG. 3 has on its right-hand end a spring plate 74 fastened thereto which rests against the right-hand end of the compression spring 68. The left-hand end of the compression spring 68 is supported against the side of the housing.

The left-hand end of the upper gear rack 64 likewise carries a spring plate 76 which rests against the right-hand end of the compression spring 66, wherein here too the left-hand end of the compression spring 66 is supported against the side of the housing.

The lower gear rack 64 as shown in FIG. 3 has loaded its assigned compression springs 70, 72 in the contrary direction. The spring-rack arrangement as a whole is point-symmetrical with respect to the central axis of the output shafts 34, 38. This means that the lower gear rack 64 has a spring plate 78 which is fastened thereto and which rests against the left-hand end of the compression spring 70, whereas the right-hand end of the compression spring 70 is supported against the side of the housing. The right-hand end of the lower gear rack 64 is coupled with a spring plate 80 which rests against the left-hand end of the compression spring 72, wherein the right-hand end of the compression spring 72 is in turn supported against the side of the housing.

If the second output shaft 38 is moved in an anticlockwise direction, as a result of which the gear wheel 62 is likewise moved in an anticlockwise direction, the upper gear rack 64 moves to the left and tensions its compression springs 66, 68 and the lower gear rack 64 moves to the right and tensions its compression springs 70, 72.

The energy storage device 16 only acts in one direction, i.e. in this installed case on relaxation of the compression springs it would cause a rotation of the second output shaft 38 in a clockwise direction.

The coupling point 60 formed by the hub can be coupled to the second output shaft 38 from two opposite sides. If the lower side of the energy storage device 16, as seen in FIG. 1, is the front side, then the upper side shown in FIG. 1 is the rear side. If the energy storage device 16 is pulled upwards off the second output shaft 38 and inverted by 180°, it can be plugged back onto the output shaft 38 with its rear side. However, as a result of this inversion of the energy storage device 16, the direction of rotation in which the energy storage device 16 acts on the second output shaft 38 is reversed. The energy storage device 16 then tries to rotate the output shaft 38 in an anticlockwise direction.

If the coupling of the energy storage device 18 to the output shaft 38 is effected by means of a fitting spring, in this case the energy storage device 16 simply needs to be additionally rotated by 180° around the central axis of the output shaft 38, since as a result of the inversion the groove for the fitting spring will change to the diametrically opposite side.

In order to hold the energy in the energy storage device 16 and thus store it, the so-called holding device 182 which is externally actuatable by means of a control (see FIG. 2) is provided which, alternatively to the aforementioned electromagnetic brake, is for example a magnetic spring lock or a clamped or form-fitting connection of some kind. In the actuated state this holding device 182 prevents a rotation of the second output shaft 38, so that the compression springs 66, 68, 70, 72 remain in their tensioned position.

The pre-tensioning of the compression springs can be varied by means of adjustment screws 86, see FIG. 3, since the spring plates 74, 76, 78, 80 can be adjusted axially relative to the gear racks 64 by means of these adjustment screws 86, because by means of these adjustment screws 86, which are screwed more or less deeply into the end face of the gear racks 64, they are spaced at a greater or lesser distance away from this. Nuts 88 are provided on the adjustment screws 86 as stops for the spring plates 74, 78. For the spring plates 76, 80, the screw heads themselves act as stops.

The adjustment by means of the adjustment screws 86 is also important because the output shaft 34 may not always be in the respective end position exactly at the end its maximum movement; otherwise slight gaps could result due to tolerances or external influences. Rather, the output shaft 34 may theoretically need to be able overrun the respective end position by a couple of degrees, so that for example a valve flap with a low pre-tension lies securely against the valve seat. These respective end positions can be different. For example, ball valves do not need to be over-rotated as far as flaps.

Figure 5:
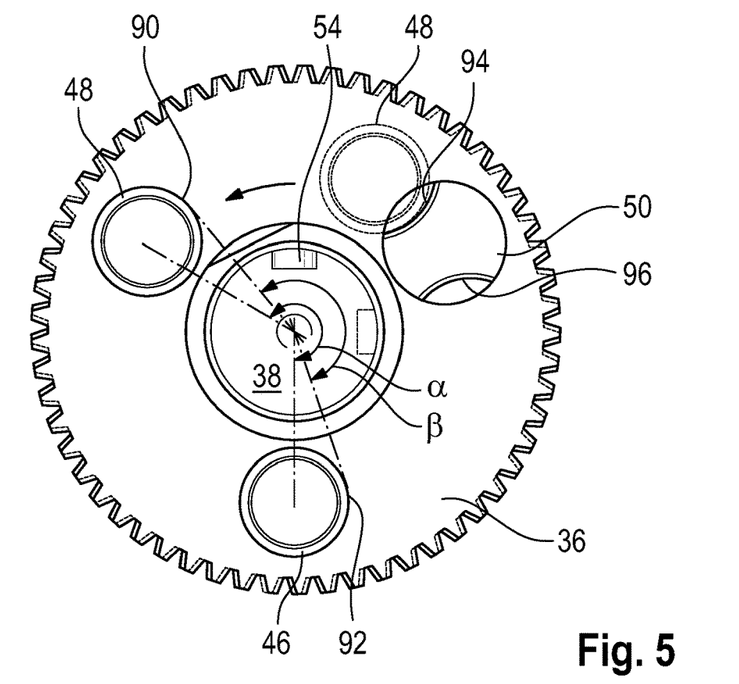
FIG. 5 shows a schematic view of the rotary entrainment device, in which the first output shaft is in or close to a first end position and the energy storage device is loaded.

FIG. 5 shows the second gear wheel 36 and the fitting spring groove 54, which is naturally offset axially in relation to the gear wheel 36, and is only drawn in to make clear the position of the second output shaft 38.

Important are on the one hand the positions of the pins 46, 48, 50 relative to one another and the fact that the two gear wheels 32, 36 in each case possess gear teeth over more than 180° of the outer circumference, such as gear teeth extending around the entire circumference, that is over 360°.

The pins 46, 48 of the gear wheel 36 are spaced apart from the central axis by a greater angle α, which is so great that the stop surfaces 90, 92 of the pins 48 or 46, which face one another around the circumference, are spaced at a distance of at least 220°. This angle is the angle ß. As can be seen in FIG. 5, if it is able to rotate to a maximum extent around the central axis relative to the pins 46, 48 without limitation by the moved part; the pin 50 can thus move within an angular range of more than 180° relative to the pins 46, 48, in this case in a clockwise direction, and in an anticlockwise direction with reference to FIG. 5.

In the position of the pin 48 represented in FIG. 5 with broken lines, the second output shaft 38 is rotated by 90° or somewhat more than 90° in a clockwise direction relative to the position not represented with broken lines. In this position, the energy storage device 16 is almost empty and now only has a low torque which it can apply to the first output shaft 34.

The functional principle of the actuator is explained in the following starting out from this starting position indicated with broken lines.

In a first state, the drive 18 engages, wherein at the same time its holding device 82 and the holding device 182, which were previously closed, are opened, so that on subsequent actuation of the drive 18 the complete second drive train 26 is activated. The second output shaft 38 is moved in an anticlockwise direction from the first end position represented with broken lines (see pin 48 with broken lines in FIG. 5) into the opposite second end position according to the arrow in FIG. 5, in that the driven pin 50 entrains the pin 48 in an anticlockwise direction. This means that the gear wheel 32 carries the gear wheel 36 and thus the output shaft 38 along with it. Thus, the gear wheel 62 and also the gear racks 64 are moved in an anticlockwise direction, so that the compression springs are tensioned. The holding device 182 is then actuated in order to block the second drive train 26 and thus the second output shaft 38. The pins 46, 48 thus remain in the position shown in FIG. 5.

During these movements, the first drive 18 can remain passive, and its holding device 82 remains closed.

Figure 6:
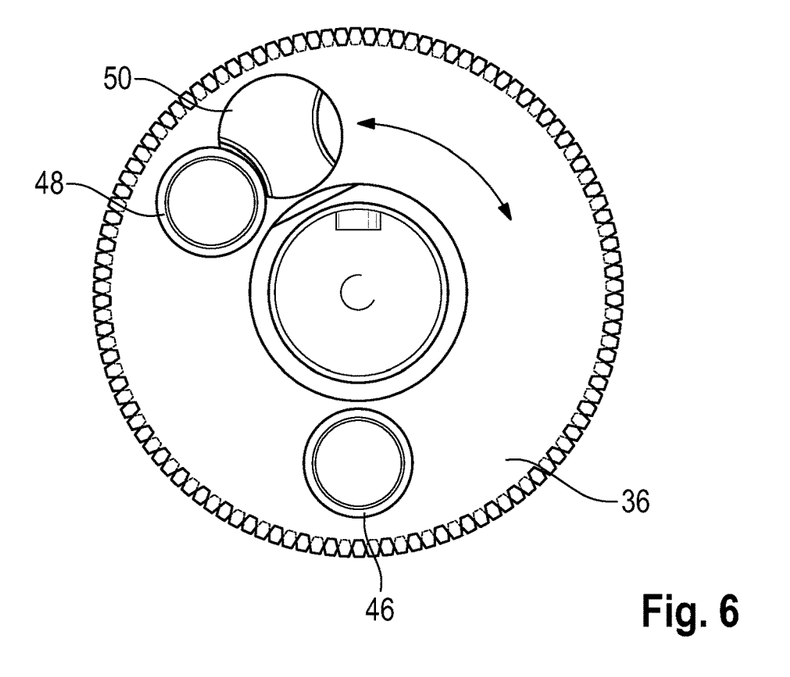
FIG. 6 shows a view of the rotary entrainment device shown in FIG. 5, in which the first output shaft is in an opposite, second end position.

In a subsequent second state, in which the holding device 82 is activated as before, the first drive 18 is activated and with it the first drive train 24. The gear wheel 32 is thus driven, such that the first output shaft 34 can be moved between a first end position and a second end position which is represented in FIG. 6. As a result, one or more valves or flaps, for example ventilation flaps in a tunnel, are opened and closed. The first end position can be the position which is represented in FIG. 5 or can lie even further in a clockwise direction, for example at three or around four o'clock. In this second state, the coupling 30 is released, i.e. no movement of the gear wheel 36 and thus of the output shaft 38 takes place in the second drive train. The drive trains 24, 26 are consequently decoupled from one another.

If, in a third state, the drives 18, 118 fail, for example due to a power failure or defect, a predefined position of the part 12 must be ensured. In this case the holding devices 82, 182 are released automatically, because in this case for example a spring-loaded magnet is no longer supplied with power, so that the spring removes and releases a corresponding part from engagement in the assigned drive train 24, 26. The energy is then abruptly released from the energy storage device 16. That is to say, in the event that, as shown in FIG. 6 for example, the part 12 is in a closed state and the pin 50 is located between its second end position and thereby rests against the pin 48, the gear wheel 36 rotates in a clockwise direction, as a result of which the pin 48 entrains the pin 50 and thus the first output shaft 34 and moves the part 12 into its first end position.

The loading of the energy storage device 16 or, more generally, the introduction of energy into the energy storage device 16 in the first state can also be achieved otherwise than as explained above. For this purpose the drives 18, 118 are simply actuated differently.

For example, in the first state both drives 18, 118 are actuated, so that both drive trains 24, 26 are activated and both output shafts 34, 38 are set in rotation separately from one another. Both holding devices 82, 182 are naturally thereby open. The pin 50 thus no longer needs to carry with it the pin 48, as explained above with reference to FIG. 5. The pins 48, 50 can thus be spaced apart one another in the first state by an angle of rotation, and nonetheless the pin 48 is moved into the position shown in FIG. 6, and at the same time energy is transferred into the energy storage device 16.

According to a further option, in the first state only the second drive train 26 is actuated, i.e. the drive 118 moves the second output shaft 38 in an anticlockwise direction, as seen in FIGS. 5 and 6 and thus introduces energy into the energy storage device 16. The position of the pin 50 remains unchanged in this state.

If the direction of rotation of the energy storage device 16 is to be changed, for example because in the event of a power failure the part 16 should no longer be in the open position but rather in the closed position, the energy storage device 16 is pulled off after it is completely or virtually completely discharged and, after being inverted and then rotated by 180° around the central axis of the coupling point 60, plugged back onto the second output shaft 38.

Figure 7:
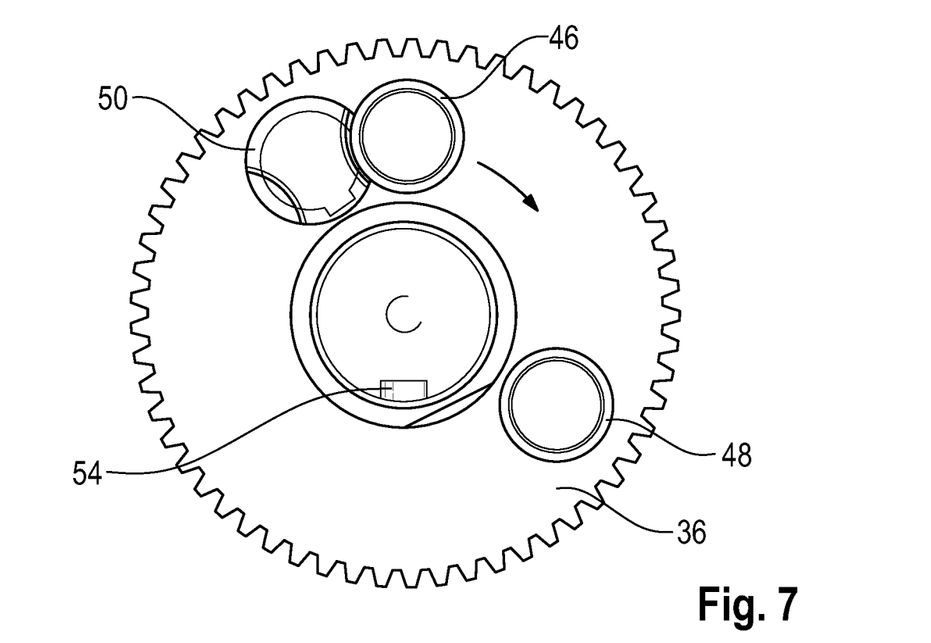
FIG. 7 shows a view of the rotary entrainment device shown in FIG. 5 with the energy storage device acting in the opposite direction to the embodiment shown in FIG. 5, before loading of the energy storage device.

However, before fitting the inverted energy storage device 16, the second gear wheel 36 is rotated by 180° in an anticlockwise direction. The pin 46 then rests against the pin 50. This rotation of the second gear wheel 36 by 180° can be seen from the position of the fitting spring groove 54 in FIG. 7.

In order to recharge the energy storage device 16, the gear wheel 36 must be moved in a clockwise direction, because the energy storage device 16 now acts in an anticlockwise direction. This movement in a clockwise direction can again be achieved in the three different ways explained above, either solely by rotating the gear wheel 36, by at the same time rotating the gear wheels 32, 36 or by rotating the gear wheel 32 and passively entraining the gear wheel 36 by means of the contact between the pins 46, 50.

Figure 8:
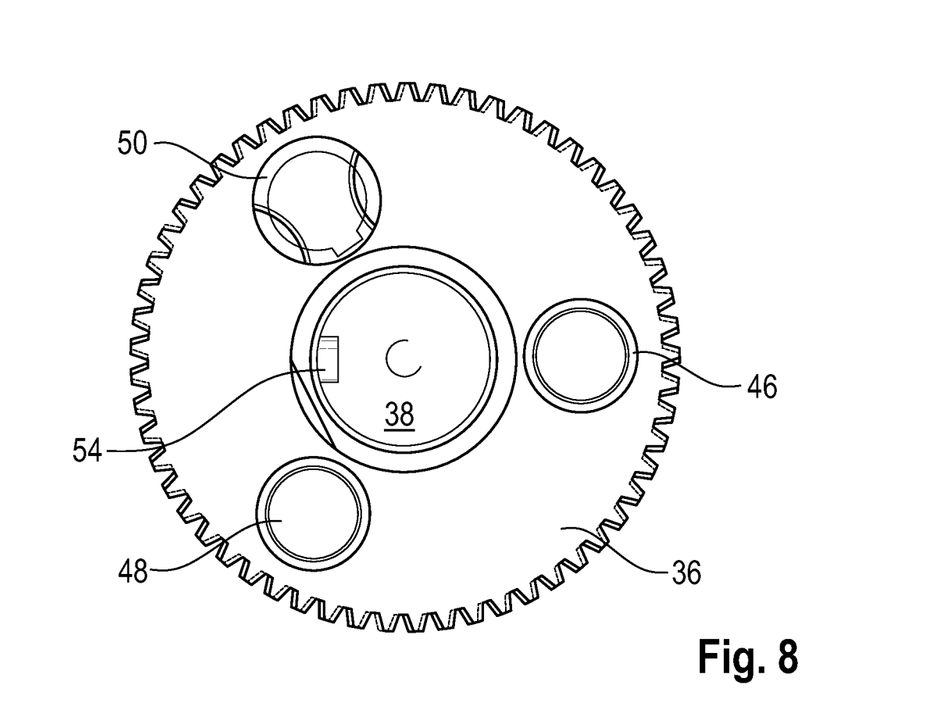
FIG. 8 shows a view of the rotary entrainment device shown in FIG. 7 with a loaded energy storage device.
Figure 9:
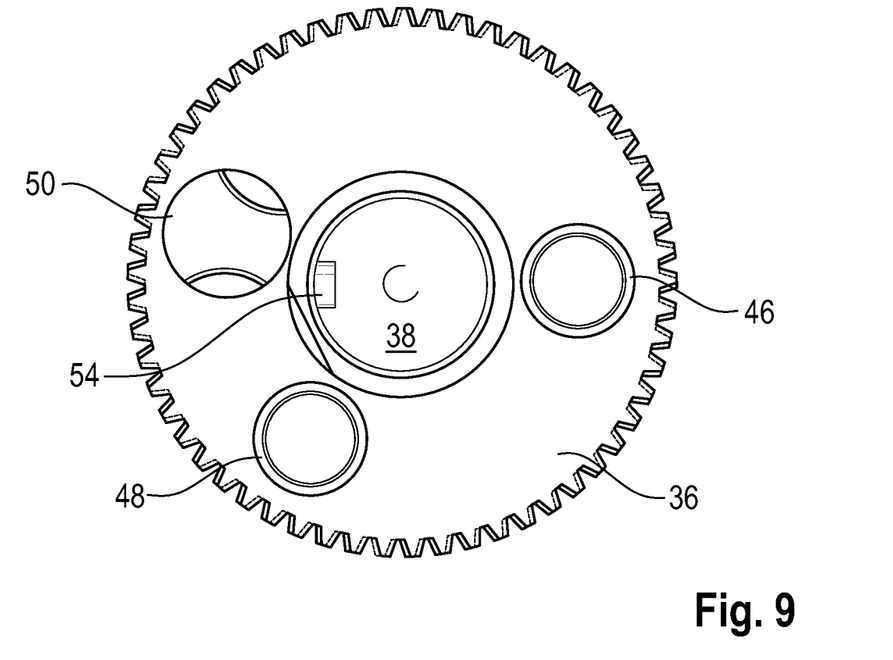
FIG. 9 shows a view of the rotary entrainment device shown in FIG. 7 with the first output shaft in a first end position.

The tensioned state of the energy storage device 16 is illustrated in FIG. 8. Following the introduction of the energy into the energy storage device 16 and activation of the holding device 182, through actuation of the coupling 28 the part 12 can then once again be moved between its two end positions, wherein this movement is symbolised in FIG. 9 through the changed position of the pin 50 in comparison with the position in FIG. 8.

One of the end positions can thereby be configured such that the pin 50 makes contact with one of the two pins 46, 48, depending on the direction of action of the energy storage device 16.

Naturally, other energy-storing parts, for example other springs or also hydraulic or pneumatic energy storage devices, can be provided instead of the compression springs.

The theoretical maximum rotary movability of the first output shaft 34 relative to the second output shaft 38 can also be described in that if for example the stop surface 90 is in contact with the stop surface 94 of the pin 50, a distance of at least 180° exists between the opposing stop surface 96 of the pin 50 and the stop surface 92. Naturally, as explained, this movability is the theoretical movability, if the actuator 10 is not affected by the part 12, that is if the part 12 does not have any stops which limit this maximum rotary movability.

Naturally, the pins 46, 48, 50 can also be formed by other projections or can also be provided directly on the output shafts 34, 38. In addition, the gear wheels 32, 36 can also transition integrally into their output shafts.

The electric motors of the drives 18, 118 can act as generators, both during the movement of the part 12 in normal operation and also with activated energy storage device.

In normal operation in particular, a control can then be used to adjust the return time taken for the movement of the part 12.

The invention claimed is:

1. A fail-safe actuator for moving a part between two end positions, comprising:
   a first drive,
   a first drive train which can be set in motion by the first drive which has a first output shaft which transmits the movement of the actuator outwards in the direction of the part,
   a second drive,
   a second drive train which can be set in motion by the second drive which has a second output shaft which runs coaxially with the first output shaft,
   wherein the first or the second drive can be activated, selectively, in order to set the first or second output shaft in motion,
   an energy storage device which is coupled with the second drive train,
   at least one externally actuatable holding device which ensures, selectively, that the energy stored in the energy storage device remains in the energy storage device or is released to the second drive train,
   a mechanical rotary entrainment device between the second output shaft and the first output shaft which is configured such that the mechanical rotary entrainment device:
   permits a rotation of the first output shaft relative to the second output shaft by at least one angle of rotation which is associated with a distance between the two end positions if the energy storage device is not released and if the first drive moves the first output shaft between the two end positions;
   provides a rotary entrainment of the first output shaft by the second output shaft with the energy storage device released and the first drive when failed in a first of the two end positions; and
   wherein the first and the second output shafts are coupleable in the direction of rotation by stop surfaces on the first and second drive train which come into contact with one another.

2. A fail-safe actuator according to claim 1, wherein both the first and second drives, the rotary entrainment device and the at least one holding device are configured and controllable in a coordinated manner such that, in a first state, the second drive moves the second output shaft in the direction of a second of the two end positions and energy is thereby introduced into the energy storage device,
   in a subsequent second state, the at least one holding device holds the energy in the energy storage device and the first drive can move the part between the two end positions,
   in a subsequent third state, in which both the first and second drives fail, the holding device releases the energy in the energy storage device and as a result the second output shaft is moved in the direction of the first end position and a rotary entrainment of the first output shaft in the direction of the first position is made possible.

3. A fail-safe actuator according to claim 2, wherein in the first state, both the first and second drives drive and both the first and second output shafts move in the direction of the second of the two end positions and energy is thereby introduced into the energy storage device, or that, in the first state, on the first output shaft being driven in the direction of the second of the two end positions by the first drive, with the second drive inactive, with discharged energy storage device and enabled holding device, the second output shaft is carried with the first output shaft.

4. A fail-safe actuator according to claim 1, wherein the holding device holds the second output shaft in the second state and thus holds the energy storage device in the state in which the energy remains in the energy storage device.

5. A fail-safe actuator according to claim 1, wherein each drive train is assigned an associated holding device, wherein the associated holding device of the first drive train is activated if the part is to be held in a position.

6. A fail-safe actuator according to claim 1, wherein the energy storage device is coupled directly or indirectly with the second output shaft and is detachable therefrom.

7. A fail-safe actuator according to claim 6, wherein the rotary entrainment device is configured such that the second output shaft can entrain the first output shaft in opposite directions of rotation, wherein the direction of rotation is dependent on the direction of rotary effect of the energy storage device.

8. A fail-safe actuator according to claim 7, wherein the energy storage device can be coupled to the second output shaft in two different positions, and in a first position ensures that the first output shaft can be pressed into one end position and in a second position can be pressed into the opposite end position.

9. A fail-safe actuator according to claim 8, wherein the first position differs from the second position in that the energy storage device is inverted by 180° and is thus coupled to the second output shaft on the rear side.

10. A fail-safe actuator according to claim 1, wherein the stop surfaces are formed on opposite end faces of gear wheels or the output shafts.

11. A fail-safe actuator according to claim 1, wherein if stop surfaces of both the first and also the second drive train are in contact with one another, the stop surfaces which are not in contact with one another are distant from one another by at least 180°.

12. A fail-safe actuator according to claim 1, wherein the energy storage device comprises at least one elastic spring element.

13. A fail-safe actuator according to claim 12, wherein several spring elements arranged symmetrically around the second output shaft are provided.

14. A fail-safe actuator according to claim 13, wherein the compression springs are coupled mechanically to the second output shaft in pairs by the same rack.

15. A fail-safe actuator according to claim 14, wherein the second output shaft is connected with the energy storage device via a gear wheel which in turn meshes with the gear teeth on the rack.

16. A fail-safe actuator according to claim 12, wherein the energy storage device is designed as a separate, externally closed assembly unit in which several spring elements are housed and which has a coupling point with the second output shaft which is accessible from opposite sides.

17. A fail-safe actuator according to claim 1, wherein both drives can be operated as generators in order to brake a movement in at least one of the drive trains.

18. An assembly unit with an actuator according to claim 1 and a part moved by the actuator which is a valve flap or ventilation flap.

19. A fail-safe actuator for moving a part between two end positions, comprising:
- a first drive,
- a first drive train which can be set in motion by the first drive which has a first output shaft which transmits the movement of the actuator outwards in the direction of the part,
- a second drive,
- a second drive train which can be set in motion by the second drive which has a second output shaft coaxial with the first output shaft,
- wherein the first or the second drive can be activated, selectively, in order to set the first or second output shaft in motion,
- at least one spring coupled with the second drive train;
- a lock which ensures, selectively, that the energy stored in the at least one spring remains therein or is released to the second drive train; and
- a selective coupling between the second output shaft and the first output shaft configured to permit a rotation of the first output shaft relative to the second output shaft by at least one angle of rotation which is associated with a distance between the end positions if the at least one spring is not released and if the first drive moves the first output shaft between the end positions and provide a rotary entrainment of the first output shaft by the second output shaft with at least one spring and the first drive when failed in a first of the two end positions;

wherein the first and the second output shafts are coupleable in the direction of rotation by stop surfaces on the first and second drive train which come into contact with one another.

* * * * *